(12) United States Patent
Yang et al.

(10) Patent No.: US 9,101,886 B2
(45) Date of Patent: Aug. 11, 2015

(54) COMPOSITE PROTON CONDUCTING MEMBRANE WITH LOW DEGRADATION AND MEMBRANE ELECTRODE ASSEMBLY FOR FUEL CELLS

(75) Inventors: Yunsong Yang, Surrey (CA); Jing Li, Surrey (CA); Keping Wang, Richmond (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 423 days.

(21) Appl. No.: 13/508,578

(22) PCT Filed: Nov. 10, 2010

(86) PCT No.: PCT/EP2010/006835
§ 371 (c)(1),
(2), (4) Date: May 8, 2012

(87) PCT Pub. No.: WO2011/057768
PCT Pub. Date: May 19, 2011

(65) Prior Publication Data
US 2012/0231367 A1    Sep. 13, 2012

Related U.S. Application Data

(63) Continuation-in-part of application No. 12/615,671, filed on Nov. 10, 2009, now abandoned.

(51) Int. Cl.
*B01D 71/82*   (2006.01)
*C08J 5/22*   (2006.01)
*H01M 8/10*   (2006.01)

(52) U.S. Cl.
CPC . *B01D 71/82* (2013.01); *C08J 5/22* (2013.01); *H01M 8/1018* (2013.01);
(Continued)

(58) Field of Classification Search
CPC ...... B01J 41/125; B01J 39/185; C01J 5/2556; H01M 8/1339
USPC .......................................... 429/483, 492, 494
See application file for complete search history.

(56) References Cited

U.S. PATENT DOCUMENTS 7,722,981 B2 *   5/2010   Jang et al. ..................... 429/493
8,124,660 B2 *   2/2012   de Figueiredo Gomes et al. ............................. 521/27
(Continued)

FOREIGN PATENT DOCUMENTS

DE   1020062009   *   5/2004
JP   4136040 A   5/1992
(Continued)

OTHER PUBLICATIONS

Salem, Ibrahim A. et al. "Kinetics and Mechanisms of Decomposition Reaction of Hydrogen Peroxide in Presence of Metal Complexes" 1. Department of Chemistry, United Arab Emirates University, Al-Ain, United Arab Emirates, 2. Department of Chemistry, Tanta University, Tanta Egypt Int. J. Chem. Chinetics Bd. 32-11 (2000) pp. 643-666.
(Continued)

*Primary Examiner* — Ula C Ruddock
*Assistant Examiner* — Thomas Parsons
(74) *Attorney, Agent, or Firm* — Patent Central LLC; Stephan A. Pendorf

(57) ABSTRACT

A small molecule or polymer additive can be used in preparation of a membrane electrode assembly to improve its durability and performance under low relative humidity in a fuel cell. Specifically, a method of forming a membrane electrode assembly comprising a proton exchange membrane, comprises providing an additive comprising at least two nitrogen atoms to the membrane electrode assembly.

23 Claims, 10 Drawing Sheets

(52) U.S. Cl.
CPC ......... *H01M 8/1067* (2013.01); *H01M 8/1081* (2013.01); *C08J 2327/18* (2013.01); *H01M 2008/1095* (2013.01); *H01M 2300/0082* (2013.01); *Y02E 60/521* (2013.01)

(56) References Cited

U.S. PATENT DOCUMENTS

| | | |
|---|---|---|
| 2005/0136308 A1 | 6/2005 | Andrews et al. |
| 2006/0083976 A1 | 4/2006 | Goddard et al. |
| 2006/0199062 A1 | 9/2006 | Yanagita et al. |
| 2006/0280982 A1 | 12/2006 | Kanaoka et al. |
| 2010/0003570 A1 | 1/2010 | Finsterwalder et al. |

FOREIGN PATENT DOCUMENTS

| | | |
|---|---|---|
| JP | 2006269266 A | 10/2006 |
| JP | 2008077974 A | 4/2008 |
| JP | 2008288097 A | 11/2008 |
| WO | 2004040685 A2 | 5/2004 |
| WO | 2005072413 A2 | 8/2005 |
| WO | 2007144633 A1 | 12/2007 |
| WO | 2008025465 A1 | 3/2008 |

OTHER PUBLICATIONS

Macartney, Donal H. The oxidation of hydrogen peroxide by tris(polypyridine) complexes of osmium(III), iron(III), ruthenium(III), and nickel (III) in aqueous media Department of Chemistry, Queen's University, Kingston, Ont., Canada Can. J. Chem. vol. 64, 1986, pp. 1936-1942.

Dimitrijevic, Nada M. et al. "Pulse-radiolytic Investigation of the Oxidation of Iron(II) and Iron(III) Complexes with 2,2'-Bipyridine" Institute of Physical Chemistry, Faculty of Science, Belgrade University, Belgrade, Yugoslavia, Boris Kidric Institute of Nuclear Sciences, Vinca 11001 Beograd, Yugoslavia J. Chem. Soc. Dalton Trans. 1982, pp. 1953-1957.

Simic, M. et al "Pulse Radiolysis of Aqueous Solutions of Carboxy, Carbamido and Pyridyl Derivatives of Pyridine" Paterson Laboratories, Christie Hospital and Holt Radium Institute, Manchester, England Int. J. Radiat. Phys. Chem. 1971, vol. 3, pp. 259-272, Pergamon Press, Printed in Great Britain.

Graf, Ernst et al. "Iron-catalyzed Hydroxyl Radical Formation" From the Department of Laboratory Medicine and Pathology, Chemistry, and Medicine, University of Minnesota, Minneapolis The Journal of Biological Chemistry, vol. 259, No. 6, Issue of Mar. 25, pp. 3620-3624, 1984.

Wycisk et al. "Direct Methanol Fuel Cell Membranes From Nafion-Polybenzimidazole Blends" Journal of Power Sources, vol. 163, No. 1, Dec. 7, 2006, pp. 9-17, XP025084657 ISSN: 0378-7753, DOI: DOI:10.1016/J.POWSOUR.2005.11.056 (retrieved on Dec. 7, 2006).

* cited by examiner

Formation of $H_2O_2$:

$H_2 \longrightarrow 2H\cdot$ (via Pt catalyst)

$H\cdot + O_2$ (diffused through PEM) $\longrightarrow HOO\cdot$ $HOO\cdot + H\cdot \longrightarrow H_2O_2$ (which can diffuse into PEM)

or $2H^+ + O_2 + 2e \longrightarrow H_2O_2$

Generation of free radical:

$H_2O_2 + M^{2+}$ ($Fe^{2+}$, $Cu^{2+}$, etc) $\longrightarrow M^{3+} + \cdot OH + OH^-$ $M^{3+} + HO_2^- \longrightarrow M^{2+} + HOO\cdot$ $\cdot OH + H_2O_2 \longrightarrow H_2O + HOO\cdot$ Attack of free radical on membrane:

$R_f - CF_2COOH + \cdot OH \longrightarrow R_f - CF_2\cdot + CO_2 + H_2O$ $R_f - CF_2\cdot + \cdot OH \longrightarrow R_f - CF_2OH \longrightarrow R_f - COF + HF$ $R_f - COF + H_2O \longrightarrow R_f - COOH + HF$

Fig. 1

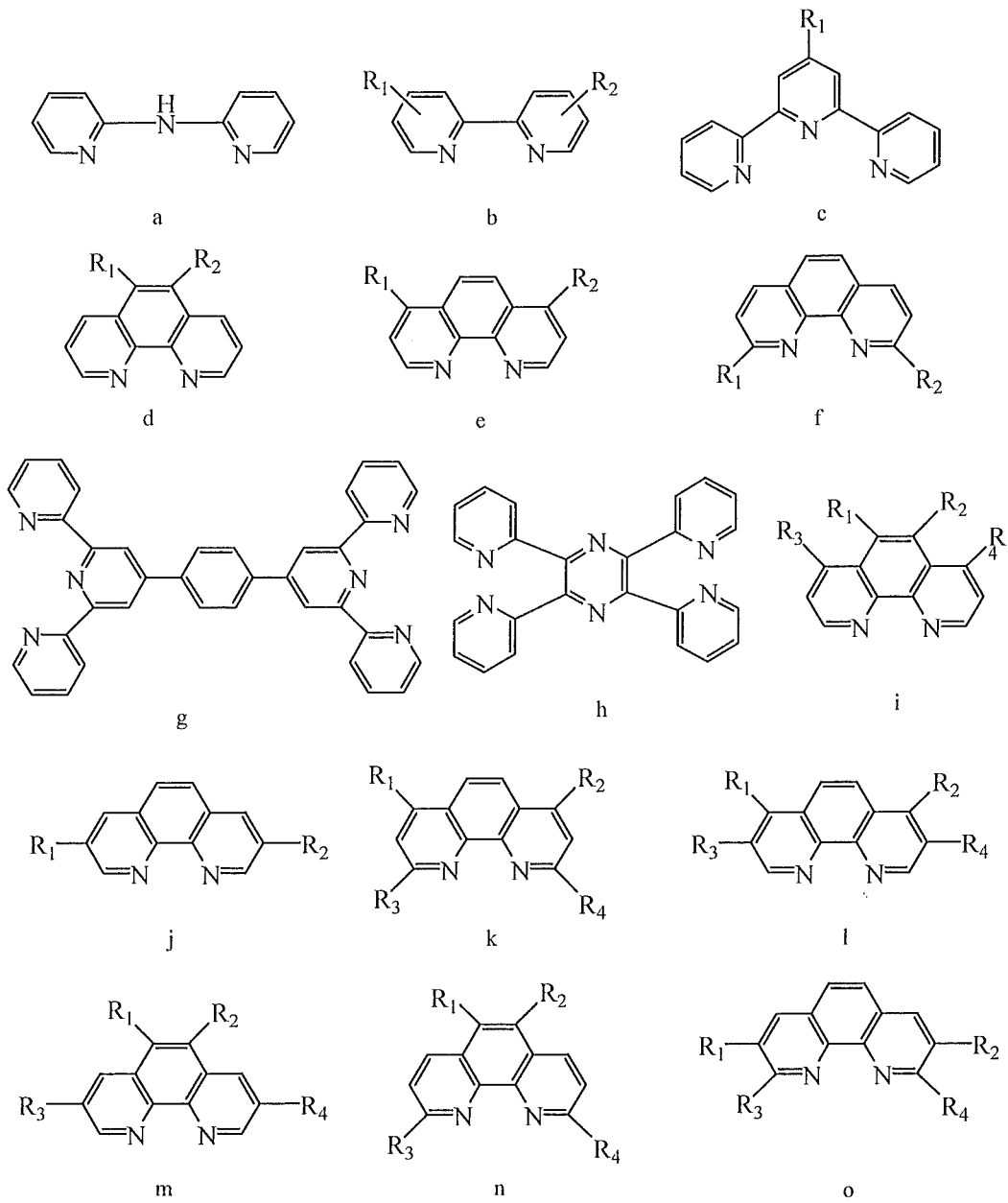
$R_1$, $R_2$, $R_3$, $R_4$ = H, $CH_3(CH_2)_n$, $CH_3(CH_2)_nO$, $CF_3(CF_2)_n$, $CF_3(CF_2)_nO$, COOH,
PO(OH)$_2$, SO$_3$H, NH$_2$, OH, 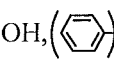–X, wherein X = H, COOH, PO(OH)$_2$, SO$_3$H,
n = 0 ~10
Fig. 2

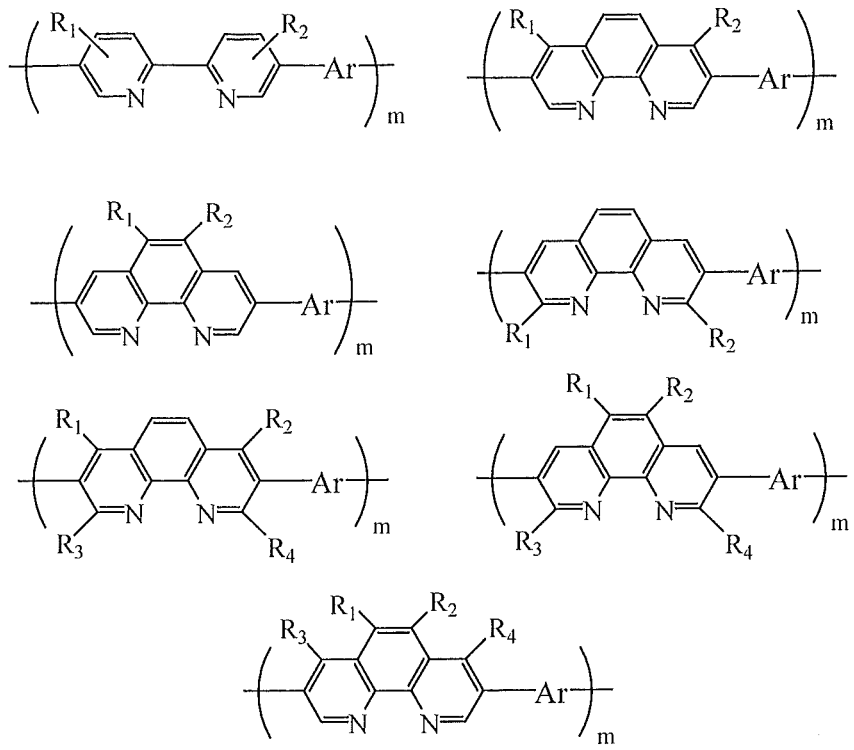
$R_1, R_2, R_3, R_4 = H, CH_3(CH_2)_n, CH_3(CH_2)_nO, CF_3(CF_2)_n, CF_3(CF_2)_nO, COOH,$
$PO(OH)_2, SO_3H, NH_2, OH,$ 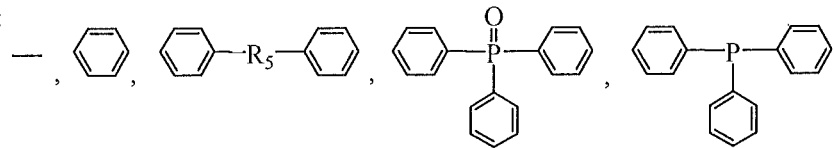 wherein $X = H, COOH, PO(OH)_2, SO_3H,$
Ar:
— , ⌬ , ⌬—$R_5$—⌬ , ⌬—P(=O)(⌬)—⌬ , ⌬—P(⌬)—⌬
$R_5 = (CH_2)_k, (CF_2)_k, O, S, C(CF_3)_2, C(CH_3)_2, (⌬)_k$
$n = 0 \sim 10; \; m = 2 \sim 100; \; k = 0 \sim 10$
Fig. 3

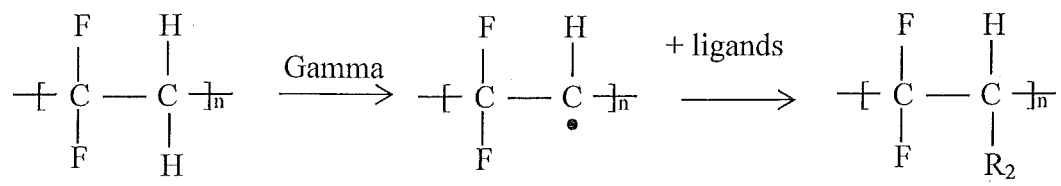
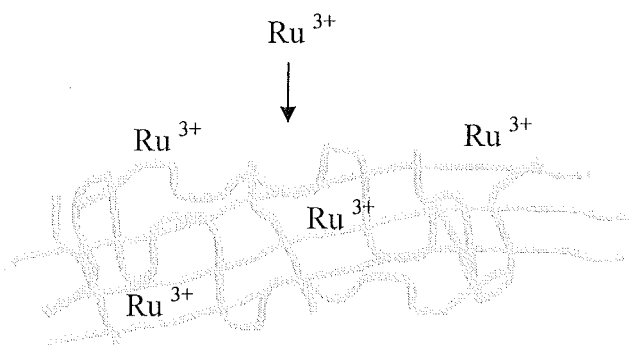
Fig. 7
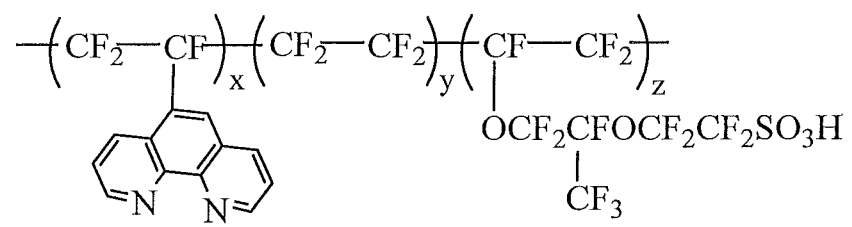
$x + y + z = 1.0$
Fig. 8

COMPOSITE PROTON CONDUCTING MEMBRANE WITH LOW DEGRADATION AND MEMBRANE ELECTRODE ASSEMBLY FOR FUEL CELLS

CROSS REFERENCE TO RELATED APPLICATION

This application is a 371 of PCT/EP2010/006835, filed Nov. 10, 2010, which is a CIP of U.S. application Ser. No. 12/615,671, filed Nov. 10, 2009. The entire contents of PCT/EP2010/006835 and Ser. No. 12/615,671 are incorporated herein by reference.

BACKGROUND

Proton exchange membrane fuel cells (PEMFCs) convert reactants, namely fuel (such as $H_2$) and oxidant (such as $O_2$ or air), to generate electric power. PEMFCs generally employ a proton conducting polymer membrane between two electrodes, namely a cathode and an anode. A structure comprising a proton conducting polymer membrane sandwiched between two electrodes is known as a membrane electrode assembly (MEA). MEA durability is one of the most important issues for the development of fuel cell systems in either stationary or transportation applications. For automotive application, an MEA is required to demonstrate durability of about 6,000 hours.

The membrane serves as a separator to prevent mixing of reactant gases and as an electrolyte for transporting protons from anode to cathode. Perfluorosulfonic acid (PFSA) ionomer, e.g., Nafion®, has been the material of choice and the technology standard for membranes. Nafion® consists of a perfluorinated backbone that bears pendent vinyl ether side chains, terminating with $SO_3H$. The chemical structure of Nafion® is as follows:

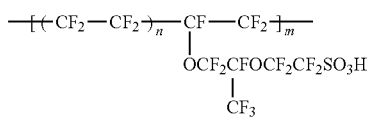

Failure of the membrane as an electrolyte will result in decreased performance due to increased ionic resistance, and failure of the membrane as a separator will result in fuel cell failure due to mixing of anode and cathode reactant gases. The chemical degradation of PFSA membrane during fuel cell operation is proposed to proceed via the attack of hydroxyl (.OH) or peroxyl (.OOH) radical species on weak groups (such as a carboxylic acid group) on the ionomer molecular chain. The free radicals may be generated by the decomposition of hydrogen peroxide with impurities (such as $Fe^{2+}$) in a Fenton type reaction. In fuel cells, hydrogen peroxide can be formed either at Pt supported on carbon black in the catalyst layers or during the oxygen reduction reaction. The formation of hydrogen peroxide, generation of free radical, and degradation of the membrane are depicted in the scheme of FIG. 1.

The hydroxyl radical attacks the polymer at unstable end groups to cause chain zipping and/or could also attack an $SO_3^-$ group under dry condition to cause polymer chain scission. Both attacks degrade the membrane and eventually lead to membrane cracking, thinning or forming of pinholes. The membrane degradation rate is accelerated significantly with increasing of the operation temperature and decreasing inlet gas relative humidity (RH).

Additive technologies have been applied to reduce membrane degradation in fuel cells. Additives studied included metal chelating agents, antioxidants, free radical scavengers, catalysts for decomposition of hydrogen peroxide, and combinations thereof.

The Japanese patent application JP 2008077974 A discloses electrodes for fuel cells in which the catalyst particles and the conductive carrier of the electrode catalyst layer are covered with a chemical compound consisting of nitrogen-containing 6 membered rings.

What is needed is an improved additive technology that provides additional resistance of MEAs, and specifically PFSA membranes of the MEAs, to degradation, resulting in improved MEA durability and performance under low RH in a fuel cell.

SUMMARY

Provided is a small molecule or polymer additive that can be used in preparation of a composite PFSA membrane to improve durability and performance under low RH in a fuel cell. In particular, a water insoluble small molecule or polymer containing at least two nitrogen atoms (e.g., —NH—, —N=, or both —NH— and —N= groups) can be used in the preparation of composite proton exchange membranes (PEMs).

Specifically, provided is a method of forming a membrane electrode assembly comprising a proton exchange membrane and electrode, the method comprising providing an additive comprising at least two nitrogen atoms to the membrane electrode assembly, where the additive can form a complex with a metal ion. Providing the additive to the membrane electrode assembly comprises incorporating the additive into the membrane. It is preferred that the membrane is a perfluorosulfonic acid membrane or a hydrocarbon ionomer membrane.

Further, provided is a proton exchange membrane for a membrane electrode assembly comprising perfluorosulfonic acid and an additive comprising at least two nitrogen atoms.

BRIEF DESCRIPTION OF THE FIGURES OF THE DRAWINGS

FIG. 1 illustrates a scheme depicting the degradation of a membrane in a fuel cell.

FIG. 2 shows exemplary small molecular additives according to the present disclosure.

FIGS. 3 and 4 show exemplary polymer additives according to the present disclosure.

FIG. 7 illustrates a scheme of grafting complex forming units (i.e., ligands) to a polymer for $Ru^{3+}$ capture.

FIG. 8 illustrates an exemplary perfluoro backbone including an additive according to the present disclosure.

DETAILED DESCRIPTION

The presently disclosed additives, which can be used in the membrane to protect the membrane from hydroxyl radical attack, are selected based on a high reactive rate with hydroxyl radicals, less impact on fuel cell performance than has been observed with most metal oxide radical scavengers, and low water washability.

The additive can be incorporated into the membrane by mixing, for example, a perfluorosulfonic acid ionomer dispersion or a hydrocarbon ionomer solution with an additive to provide an additive and ionomer solution. A membrane is then cast from the mixture solution.

The presently disclosed additives contain at least two nitrogen atoms for formation of a complex with metal ions. The additive, which can be added into the membrane or ionomer, is a water insoluble organic molecule or a polymer with functional groups which can coordinate with metal ions that exist in the membrane or the metal ions formed during fuel cell operation, rather than being a complex of metal ion or oxide. The additive is soluble in a PFSA ionomer dispersion.

Figure 4:
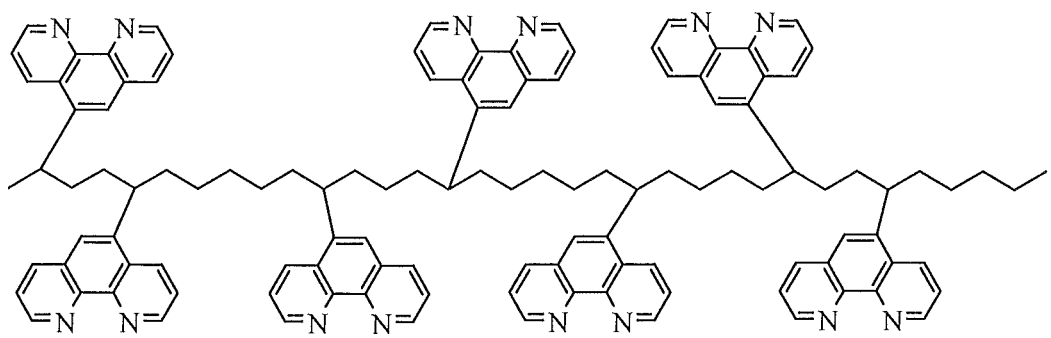

The additive can be a small molecule or polymer which contains units to form a complex with metal ions. As examples, the chemical structure of small molecular additives such as dipyridylamine, dipyridyl, phenanthroline, terpyridine, 4'-4""-(1,4-phenylene)bis(2,2':6',2"-terpyridine), tetra-2-pyridinylpyrazine and their derivatives are shown in FIG. 2. With regard to polymer additives, the complex forming units can be either on the polymer backbone (FIG. 3) or on side chains (FIG. 4). The additives can be homopolymers of complex forming units or copolymers of complex forming units with an aromatic structure (such as poly(ether ketone), poly (ether sulfone), poly(phenylene), etc) (FIG. 3). Copolymers can be random or block copolymers. When a complex forming unit is on the polymer side chain, it can be directly attached to the polymer backbone or attached via a spacer. The polymer backbone can be an aromatic, semi- or perfluoro aliphatic polymer. On each side chain, there can be one complex forming unit or multiple complex forming units. In FIGS. 2 and 3, n=0-10, and in FIG. 3, m=2-100, k=0-10.

When incorporated into a membrane, the additive can be present in an amount of about 0.01 to 10 weight %, for example, from about 0.5 to 2.0 weight %, based on weight of the membrane.

Figure 5:
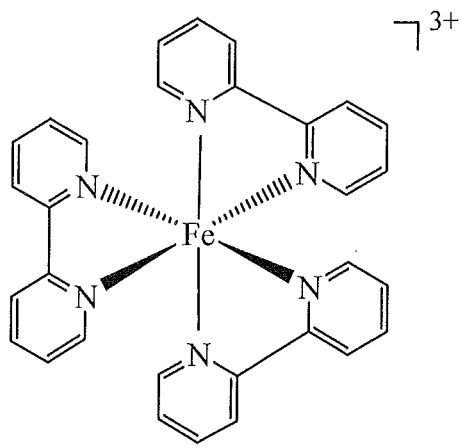
FIG. 5 shows a complex of 2,2'-Bipyridine and a $Fe^{3+}$ ion.

The presently disclosed additives have multiple functions. First, the additives can form complexes with metal ion impurities in the membrane or ionomer. The metal ions could come from, for example, processing of ionomer synthesis and membrane fabrication or from humidity water streams, Gas Diffusion Layer (GDL), or bipolar plates during fuel cell operation. The metal ions react with hydrogen peroxide (produced during fuel cell operation) to generate free radicals to degrade the membrane. After forming a complex with the additive, the metal ions are inactivated. Therefore, less or even no free radicals will be generated. It has been proven that metal ion chelating agents can reduce generation of free radicals in a Fenton like reaction. (See The Journal of Biological Chemistry, 1984, 259(6): 3620-3624). Second, the additive itself is a free radical scavenger, and the formed complex with the metal ion becomes an even better free radical scavenger. For example, the reaction rate of 2,2'-bipyridine with hydroxyl free radical is $6.2 \times 10^9$ L mol$^{-1}$ s$^{-1}$ (Int. J. Radiat. Phys. Chem. 1971, 3: 259-272), while the reaction rate of tris(2,2'-bipyridyl) iron(III) ion (see FIG. 5) with hydroxyl free radical is $1.0 \times 10^{10}$ L s$^{-1}$ s$^{-1}$ (J. Chem. Soc., Dalton Trans., 1982, 1953-1957). Said tris(2,2'-bipyridyl) iron(III) complex illustrated in FIG. 5 may be one possible reaction product of an additive according to the present invention with an undesirable metal impurity such as $Fe^{3+}$ ions. In fact, occurrence of $Fe^{3+}$ or $Fe^{2+}$ ions within a fuel cell is likely, because this kind of impurity may be created during undesirable corrosion processes of iron containing parts of the fuel cell. Such complexes are formed when said additives, in the illustrated case 2,2'-bipyridine, are incorporated into the membrane of the membrane electrode assembly and, e.g. during operation, complex ingressing metal impurities, in the illustrated case $Fe^{3+}$. Third, the complex of a complex forming unit with a metal ion can oxidize hydrogen peroxide to produce $H_2O$ and $O_2$ in a non-Fenton chemistry (D. H. Macartney, Can J Chem 1986, 64: 1936-1942; I. A. Salem, M El-maazawi, A. B. Zaki, International Journal of Chemical Kinetics, 2000, 32(11): 643-666). Therefore, hydrogen peroxide produced during fuel cell operation is decomposed by the complex without generation of free radicals.

Furthermore, the cobalt, ruthenium and platinum metals or alloys used as anode or cathode catalysts can dissolve into ionomers under an electric field in the acidic environment during fuel cell operation, especially, in start up-shut down process or cell voltage reversal due to fuel starvation. Ruthenium dissolved in anode and crossover to cathode is a serious issue that can cause performance loss due to lowering of Pt surface catalysis activity.

Complex forming units according to the present disclosure can bond to metals, for example, cobalt, ruthenium or platinum, to form coordinate complexes. These complexes are highly active with regard to decomposition of hydrogen peroxide to produce water. These complexes, particularly a complex containing platinum, can also catalyze the reaction of hydrogen with oxygen to produce water. Therefore, the complexes formed in the ionomer layer and membrane can function as catalysts that catalyze hydrogen and oxygen from crossover to produce water in the membrane to make it self-humidifying.

Without wishing to be bound by any theories, it is believed that the complexes can also provide a static electric field force to dissociate protons when there are not enough water molecules (less than three molecules per $SO_3^-$ group) in the membrane under dry condition. Therefore, the hydrogen atoms, which bond to an $SO_3^-$ group via a hydrogen bond, can be dissociated to be a proton and transport through the membrane to improve the conductivity under dry conditions.

Figure 6:
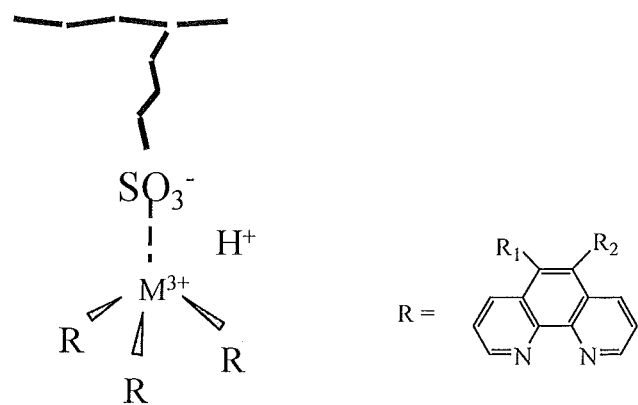
FIG. 6 illustrates a scheme of proton dissociation by a complex.

To prevent ruthenium crossover from anode to cathode, the complex forming units can (1) be chemically bond to a polymer backbone, as shown in FIG. 6, and then be added into a membrane, and/or (2) be grafted onto the surface of porous polymer reinforcement materials, such as, for example, polyvinylidene fluoride (PVDF) nanofiber porous film, as shown in FIG. 7. The grafting of complex forming units onto PVDF can be through radical reaction created by radiation. The PVDF layer with a surface modified by grafting complex forming units is chemically inert and immobile. $Ru^{3+}$ can be trapped via coordinating with the complex forming units (i.e., ligands) within this layer as shown in FIG. 7.

The presently disclosed additives can be used with PFSA or hydrocarbon ionomers in dense proton conducting membranes, as well as together with a PFSA membrane or hydrocarbon ionomer and a porous polymer matrix in a reinforcement proton conducting membrane. In particular, the polymer matrix can comprise the presently disclosed additive. The porous matrix can comprise, for example, PTFE (polytetrafluoroethylene), PVDF (polyvinylidene fluoride), P(VDF-HFP) (poly(vinylidenefluoride-co-hexafluoropropylene)), poly(ethylene), poly(propylene), poly(ethylene-co-propylene), poly(ether sulfone), poly(ether ketone), poly(imide), and/or poly(benzimidazole). Furthermore, the porous polymer matrix can comprise a polymer selected from the group consisting of sulfonated polytetrafluoroethylene, sulfonated polyvinylidene fluoride, sulfonated poly(vinylidenefluoride-co-hexafluoropropylene), sulfonated poly(ethylene), sulfonated poly(propylene), sulfonated poly(ethylene-co-propylene), sulfonated poly(ether ketone), sulfonated poly(ether sulfone), sulfonated poly(imide), sulfonated poly(benzimidazole), and combinations thereof. In another embodiment, the porous polymer matrix can comprise a polymer selected from the group consisting of phosphonated polytetrafluoroethylene, phosphonated polyvinylidene fluoride, phosphonated poly(vinylidenefluoride-co-hexafluoropropylene), phosphonated poly(ethylene), phosphonated poly(propylene), phosphonated poly(ethylene-co-propylene), phosphonated poly(ether ketone), phosphonated poly(ether sulfone), phosphonated poly(imide), phosphonated poly(benzimidazole), and combinations thereof. The porous matrix can be modified to bear one or more functional groups, such as, for example, the above-described complex forming units and/or proton carriers (e.g., sulfonic acid, phosphonic acid, sulfonimide, carboxylic acid, and/or sulfonamide).

Additionally, provided is a fuel cell comprising a proton conducting membrane and at least one electrode, wherein the proton conducting membrane comprises a perfluoro backbone or hydrocarbon ionomer comprising the presently disclosed additive (i.e., comprising at least two nitrogen atoms). A monomer bearing one or more complex forming units can be used to synthesize fluoro or hydrocarbon ionomers for a proton conducting polymer. An exemplary perfluoro backbone including an additive comprising two nitrogen atoms is illustrated in FIG. 8.

The membrane electrode assembly can be fabricated in any conventional manner. It is preferred, however, that the assembly is fabricated by bonding a proton conducting membrane with the cathode, anode, or both electrodes; or by bonding a catalyst coated membrane with a gas diffusion layer.

The following illustrative examples are intended to be non-limiting.

EXAMPLES

A comparative MEA was formed using a chemical stabilized DuPont™ Nafion® PFSA NRE211 membrane (without additive, hereinafter "NRE211"), bonded with two gas diffusion electrodes. Exemplary MEAs were formed by mixing additives into a PFSA ionomer solution, from which a membrane was cast and bonded with two gas diffusion electrodes. The additives were 5 weight % (of membrane) of the small molecule illustrated as a in FIG. 2 (hereinafter referred to as "A1"); 5 weight % (of membrane) of the small molecule illustrated as b in FIG. 2 (when $R_1=R_2=H$, hereinafter referred to as "A2"); and 1 weight % (of membrane) of 1-10-phenanthroline (d in FIG. 2 when $R_1=R_2=H$, hereinafter referred to as "A4 additive"). Membrane chemical degradation rate in an open circuit voltage (OCV) test at 95° C. and 30% RH was characterized by fluorine release rate (FRR) in cathode and/or anode outlet water and OCV lifetime.

Figure 9:
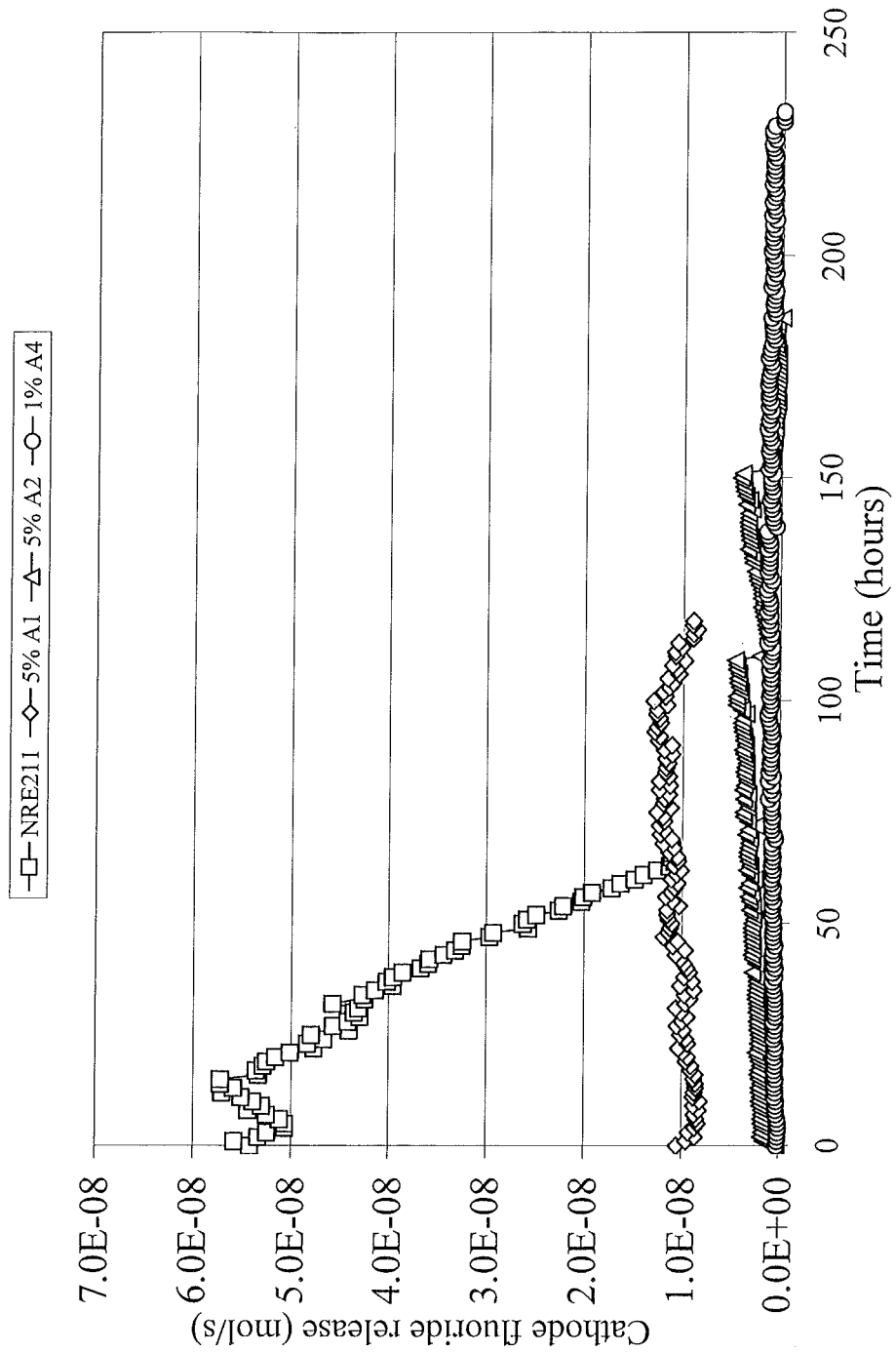
FIG. 9 is a graph of fluorine release rates of various membranes.

In particular, FIG. 9 shows FRRs of the comparative membrane and three exemplary membranes described above. As shown in FIG. 9, the FRR of each of the three exemplary membranes was lower than that of NRE211. A4 additive was found to be more efficient than A1 additive or A2 additive in reducing membrane chemical degradation, as the membrane with 1 weight % A4 additive had a lower FRR than the membrane with 5 weight % A1 additive or the membrane with 5 weight % A2 additive.

Table 1 provides OCV lifetime results of monolithic membranes with different additives.

TABLE 1

| Membrane | 1 wt. % A4 | 5 wt. % A1 | 5 wt. % A2 | NRE211 |
|---|---|---|---|---|
| OCV lifetime (hours) | 230 | 119 | 186 | 66 |

Figure 10:
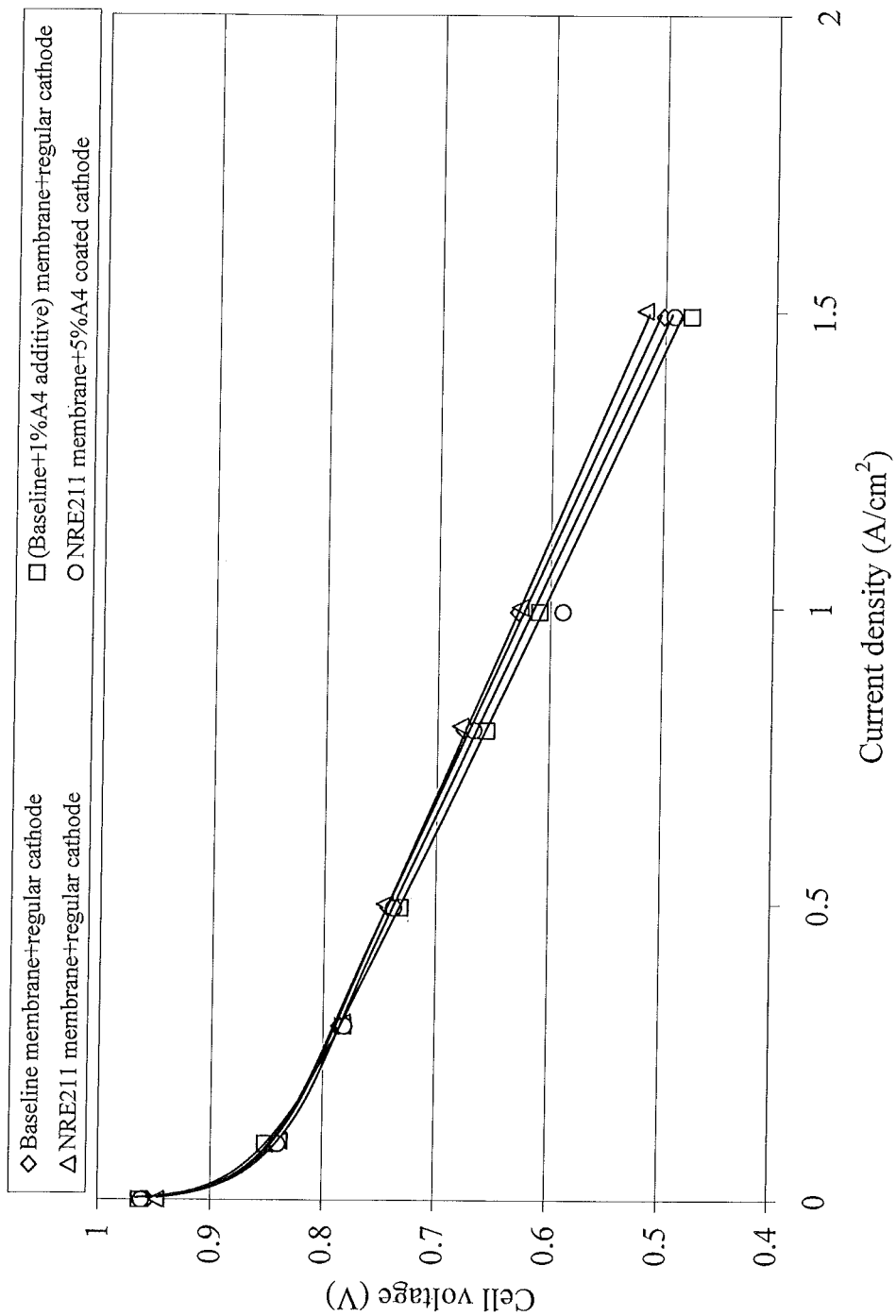
FIGS. 10 and 11 are graphs of polarization curves of various membranes at 95° C., 95% relative humidity and 30% relative humidity, respectively.
Figure 11:
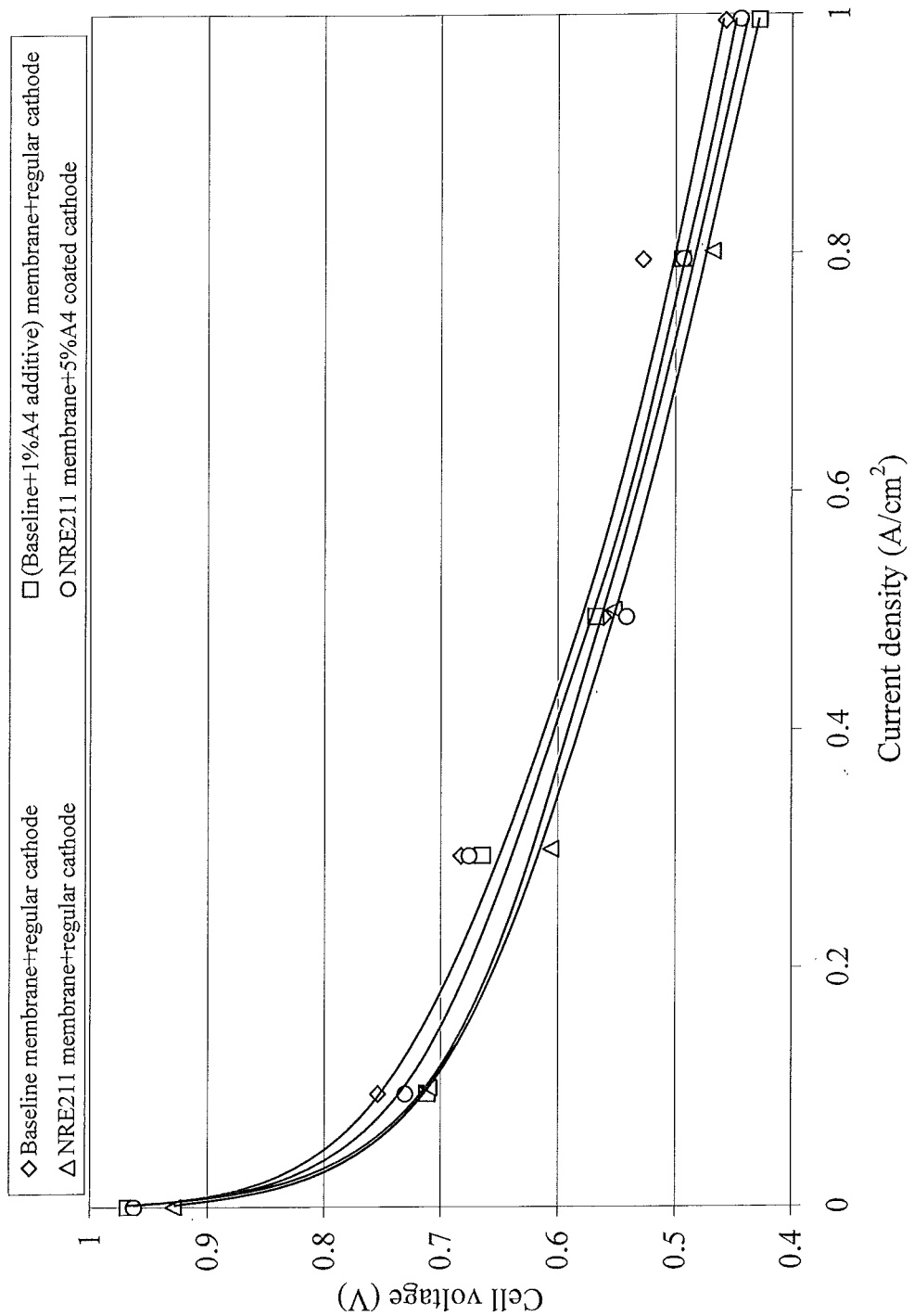

While the OCV lifetime of the 1 wt. % A4 membrane was approximately 4 times longer than that of NRE211, as shown in Table 1, performance of the membrane with A4 additive was only slightly lower than a "Baseline" membrane without additive (due to the strong interaction of additive with $SO_3H$, resulting in slightly lower conductivity), as shown in FIGS. 10 and 11, which are graphs of polarization curves of various membranes at 95° C., 95% relative humidity and 30% relative humidity, respectively.

In FIGS. 10 and 11, "Baseline" refers to a cast PFSA membrane, while "Baseline ionomer+1 wt. % A4 additive" refers to a "Baseline" cast PFSA membrane with 1 weight % A4 additive. Both membranes were bonded with two GDEs with Pt loading of 0.7 mg/cm$^2$ in the cathode and 0.3 mg/cm$^2$ in the anode to make MEAs. NRE211 was bonded with the same GDEs to make another comparative MEA, while an MEA with NRE211 bonded to the same anode, but with a cathode that had catalyst with 5 weight % A4 additive in the ionomer coated on a GDL was also formed. In the 5 weight % A4 coated cathode, 5 weight % is the weight percentage of additive to (ionomer+additive). In the process for preparation of the 5 weight % A4 coated cathode, 5 weight % A4 additive was dissolved in an ionomer dispersion, and then the ionomer dispersion containing 5 weight % additive was mixed with catalyst to make ink, which was spray coated on a GDL to make a GDE.

Figure 12:
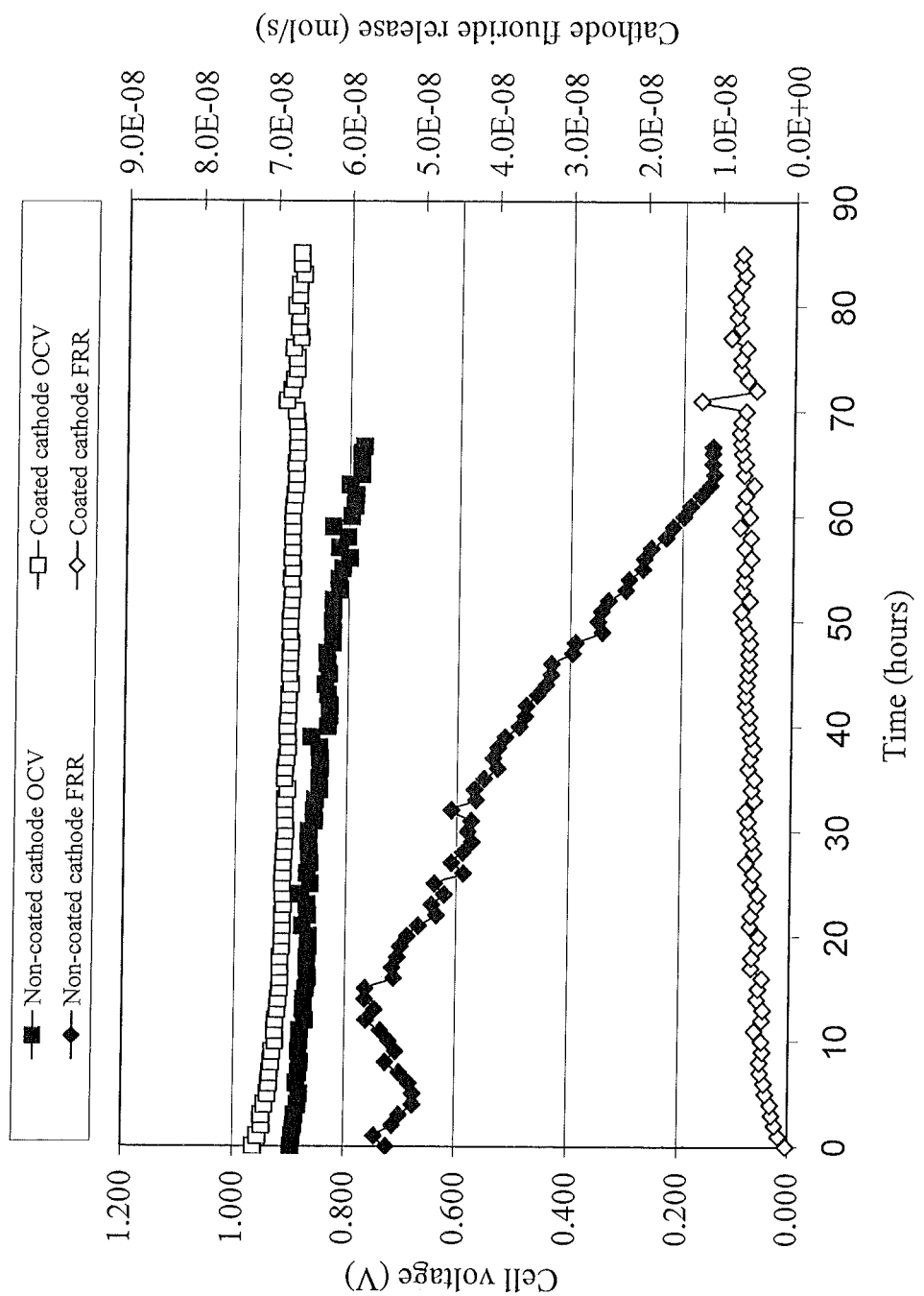
FIG. 12 shows results of open circuit voltage tests and fluorine release rates of various MEAs.

Regarding the effect of A4 additive on performance and stability of catalyst, while an MEA containing NRE211 and a cathode coated with PFSA ionomer containing 5 weight % A4 additive showed only slightly lower performance than the "Baseline" MEA of FIGS. 10 and 11, an MEA with a coated cathode had a much lower FRR than an MEA with a non-coated cathode, as demonstrated in FIG. 12, which shows results of open circuit voltage tests and fluorine release rates of MEAs with NRE211 and a coated or non-coated cathode.

Figure 13:
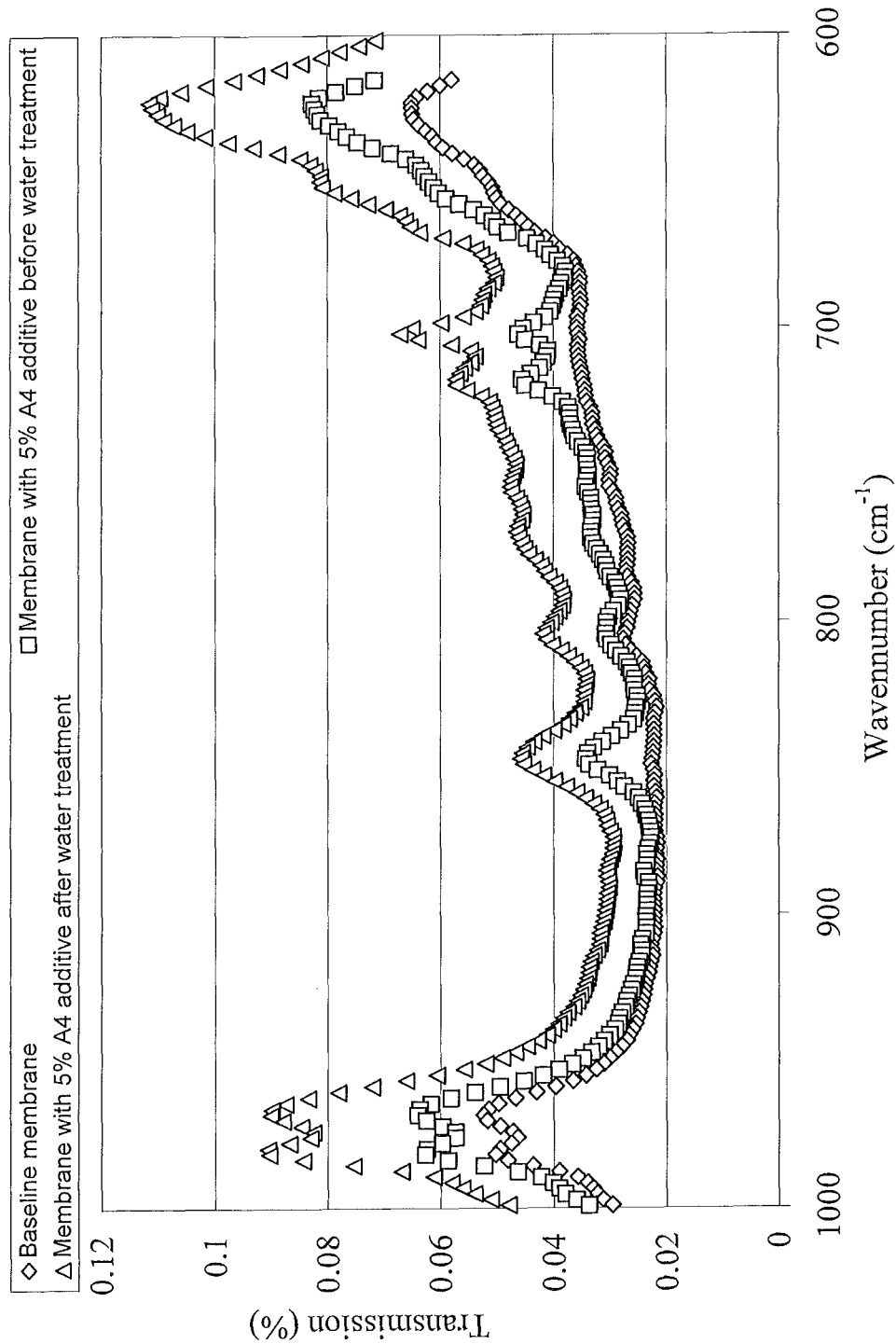
FIG. 13 is an Fourier transform infrared spectroscopy (FTIR) spectra of various membranes.

While the additive has strong interactions with PFSA membranes, the additive is water insoluble. As shown in FIG. 13, when a 0.2 g membrane containing 5 weight % A4 additive was soaked in 300 mL water at 80° C. for 70 hours, there was no evidence of additive concentration decrease from infrared (IR) measurement.

Thus, the presently claimed method, proton exchange membrane, and membrane electrode assembly provide for reduced MEA degradation, as evidenced by FRR and OCV lifetime results. The presently disclosed additives efficiently reduce chemical degradation of ionomer in the membrane. Consequently, not only is membrane durability increased, but stability of catalyst in the electrode is also increased.

While various embodiments have been described, it is to be understood that variations and modifications may be resorted to as will be apparent to those skilled in the art. Such variations and modifications are to be considered within the purview and scope of the claims appended hereto.

The invention claimed is:

1. A method of forming a membrane electrode assembly comprising a proton exchange membrane and electrodes, the method comprising:
   incorporating an additive into the proton exchange membrane of the membrane electrode assembly, comprising a step of mixing the additive with the proton exchange membrane material,
   wherein the additive is an uncomplexed ligand having at least two nitrogen atoms which can act as coordination sites, so that the uncomplexed additive in the finished proton exchange membrane is available to form complexes with metal ion impurities in the membrane, and
   wherein the membrane is a perfluorosulfonic acid membrane or a hydrocarbon ionomer membrane.

2. The method of claim 1, wherein the additive is selected from the group consisting of small molecules, polymers, or combinations thereof.

3. The method of claim 1, wherein the additive is a small molecule selected from the group consisting of:

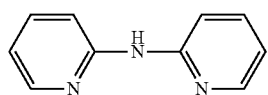

a

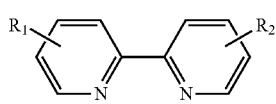

b

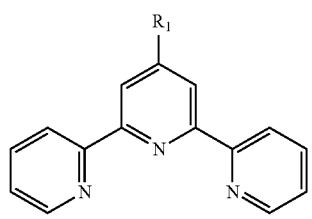

c

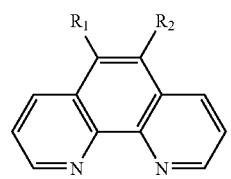

d

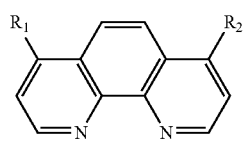

e

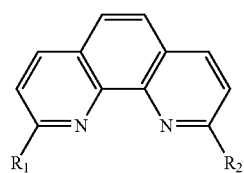

f

-continued

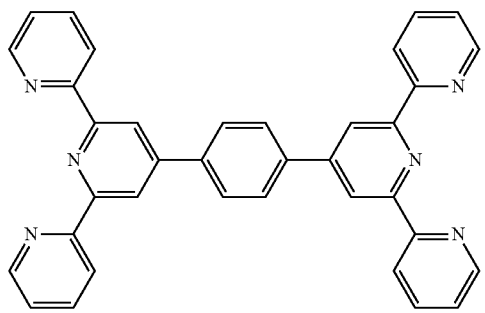

g

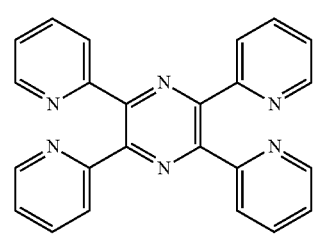

h

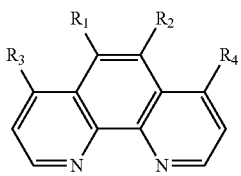

i

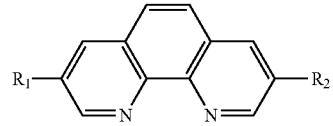

j

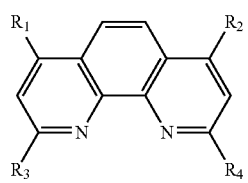

k

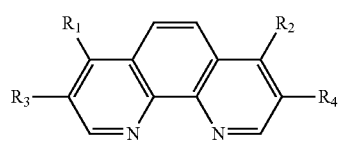

l

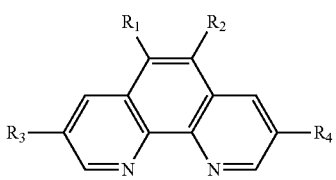

m

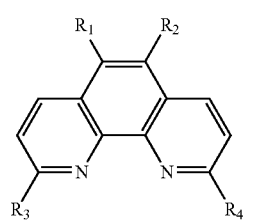

n

-continued

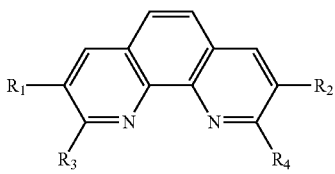

wherein $R_1$, $R_2$, $R_3$ and $R_4$ are independently selected from the group consisting of
H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH,

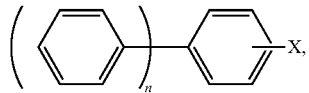

wherein X=H, COOH, $PO(OH)_2$, $SO_3H$,
and n=0-10.

4. The method of claim 1, wherein the additive is a polymer and the at least two nitrogen atoms are on a backbone of the polymer.

5. The method of claim 4, wherein the additive is selected from the group consisting on

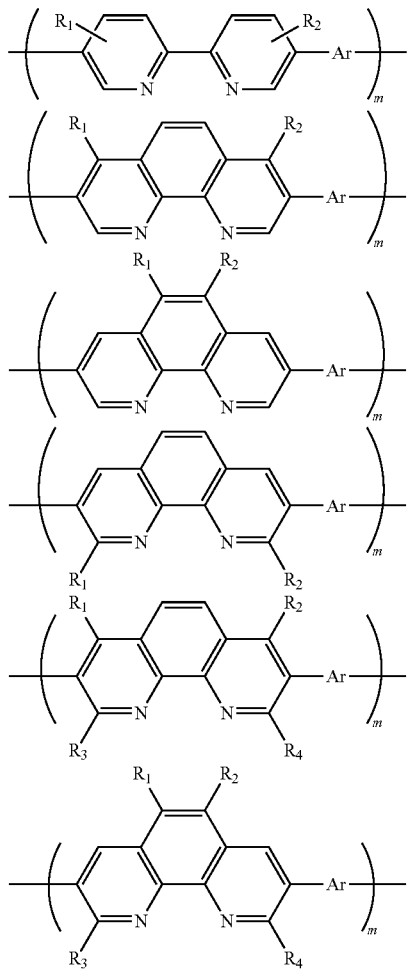

-continued

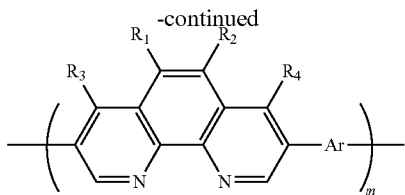

wherein m=2-100,
and $R_1$, $R_2$, $R_3$ and $R_4$ are independently selected from the group consisting of:
H, $CH_3(CH_2)_n$, $CH_3(CH_2)_nO$, $CF_3(CF_2)_n$, $CF_3(CF_2)_nO$, COOH, $PO(OH)_2$, $SO_3H$, $NH_2$, OH,

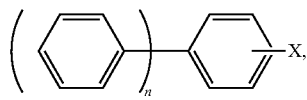

wherein X=H, COOH, $PO(OH)_2$, $SO_3H$,
and Ar is selected from the group consisting of:

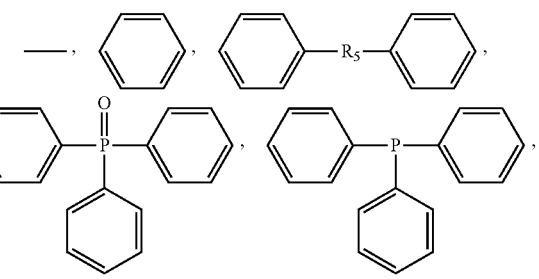

and $R_5$ is selected from the group consisting of:
$R_5$=$(CH_2)_k$, $(CF_2)_k$, O, S, $C(CF_3)_2$, $C(CH_3)_2$,

and n, k=0-10.

6. The method of claim 1, wherein the additive is a polymer and the at least two nitrogen atoms are on one or more side chains of the polymer.

7. A membrane electrode assembly formed according to the method of claim 1.

8. A method of protecting a proton exchange membrane of a membrane electrode assembly from hydroxyl radical attack comprising forming a membrane electrode assembly according to the method of claim 1.

9. The method of claim 1, wherein incorporating the additive into the membrane comprises:
mixing a perfluorosulfonic acid ionomer dispersion or hydrocarbon ionomer solution with an additive comprising at least two nitrogen atoms to provide an ionomer and additive mixture solution; and
casting a membrane from the ionomer and additive mixture solution.

10. The membrane electrode assembly of claim 1, wherein the membrane electrode assembly is fabricated by bonding a proton conducting membrane with the cathode and anode electrodes.

11. The membrane electrode assembly of claim 10, wherein the membrane electrode assembly is fabricated either by bonding electrodes with proton conducting membrane or by bonding a catalyst coated membrane with a gas diffusion layer.

12. The membrane electrode assembly of claim 1, wherein the membrane electrode assembly is fabricated by bonding a catalyst coated membrane with a gas diffusion layer.

13. A proton exchange membrane for a membrane electrode assembly comprising:
perfluorosulfonic acid or a hydrocarbon ionomer; and
an additive;
wherein the additive is an uncomplexed ligand having at least two nitrogen atoms which can act as coordination sites, so that the additive can form complexes with metal ions.

14. The membrane of claim 13, wherein the additive is selected from the group consisting of small molecules, polymers, or combinations thereof.

15. The membrane of claim 13, wherein the additive is present in an amount of about 0.01 to 10 weight % of the membrane.

16. The membrane of claim 13, wherein the additive is present in an amount of about 0.5 to 2.0 weight % of the membrane.

17. A reinforcement proton conducting membrane comprising:
a perfluorosulfonic acid or a hydrocarbon ionomer; and
a porous polymer matrix,
wherein the porous polymer matrix comprises an additive, the additive being an uncomplexed ligand having at least two nitrogen atoms or chemical units comprising at least two nitrogen atoms, the at least two nitrogen atoms being able to act as coordination sites, so that the uncomplexed additive can form complexes with metal ions in the reinforcement proton conducting membrane.

18. The reinforcement proton conducting membrane of claim 17, wherein the porous polymer matrix comprises a polymer selected from the group consisting of polytetrafluoroethylene, polyvinylidene fluoride, poly(vinylidenefluoride-co-hexafluoropropylene), poly(ethylene), poly(propylene), poly(ethylene-co-propylene), poly(ether sulfone), poly(ether ketone), poly(imide), poly(benzimidazole), and combinations thereof.

19. The reinforcement proton conducting membrane of claim 17, wherein the porous polymer matrix comprises a polymer selected from the group consisting of sulfonated polytetrafluoroethylene, sulfonated polyvinylidene fluoride, sulfonated poly(vinylidenefluoride-co-hexafluoropropylene), sulfonated poly(ethylene), sulfonated poly(propylene), sulfonated poly(ethylene-co-propylene), sulfonated poly(ether ketone), sulfonated poly(ether sulfone), sulfonated poly(imide), sulfonated poly(benzimidazole), and combinations thereof.

20. The reinforcement proton conducting membrane of claim 17, wherein the porous polymer matrix comprises a polymer selected from the group consisting of phosphonated polytetrafluoroethylene, phosphonated polyvinylidene fluoride, phosphonated poly(vinylidenefluoride-co-hexafluoropropylene), phosphonated poly(ethylene), phosphonated poly(propylene), phosphonated poly(ethylene-co-propylene), phosphonated poly(ether ketone), phosphonated poly(ether sulfone), phosphonated poly(imide), phosphonated poly(benzimidazole), and combinations thereof.

21. A reinforcement proton conducting membrane comprising:
a perfluorosulfonic acid with an additive or a hydrocarbon ionomer with an additive, and a porous polymer matrix, wherein the additive is an uncomplexed ligand having at least two nitrogen atoms which can act as coordination sites, so that the additive can form complexes with metal ions.

22. A reinforcement proton conducting membrane comprising:
a perfluorosulfonic acid with an additive or a hydrocarbon ionomer with an additive; and a porous polymer matrix comprising an additive; wherein the additive is an uncomplexed ligand having at least two nitrogen atoms which can act as coordination sites, so that the additive can form complexes with metal ions.

23. A membrane electrode assembly comprising:
a proton conducting membrane; and
at least one electrode;
wherein the proton conducting membrane comprises a perfluoro backbone or hydrocarbon ionomer comprising chemical units to form complexes with metal ions, wherein the chemical units comprise at least two nitrogen atoms which can act as coordination sites, so that the chemical units can form complexes with metal ions.

* * * * *